United States Patent [19]
Dittrich et al.

[11] Patent Number: 4,795,406
[45] Date of Patent: Jan. 3, 1989

[54] ASYMMETRICAL INFINITELY VARIABLE TRANSMISSION SYSTEM

[75] Inventors: Otto Dittrich; Manfred Rattunde, both of Bad Homburg, Fed. Rep. of Germany

[73] Assignee: Reimers Getriebe AG, Zug, Switzerland

[21] Appl. No.: 91,583

[22] Filed: Aug. 31, 1987

[30] Foreign Application Priority Data

Sep. 13, 1986 [DE] Fed. Rep. of Germany ....... 3631213

[51] Int. Cl.$^4$ ................................................. F16G 1/24
[52] U.S. Cl. ......................................... 474/8; 474/201; 474/242
[58] Field of Search .................. 474/8, 201, 240, 242, 474/243, 237, 265

[56] References Cited

U.S. PATENT DOCUMENTS

| | | | |
|---|---|---|---|
| 3,016,755 | 12/1959 | Dittrich | 474/214 X |
| 3,089,346 | 5/1983 | Dittrich et al. | 474/215 X |
| 3,353,421 | 11/1965 | Ketterle et al. | 474/219 |
| 3,364,767 | 11/1965 | Bredschneider et al. | 474/215 X |
| 3,916,709 | 11/1975 | Steuer et al. | 474/215 |
| 4,276,041 | 6/1981 | Steuer | 474/243 |

FOREIGN PATENT DOCUMENTS 1119065 12/1961 Fed. Rep. of Germany .
1294130 4/1969 Fed. Rep. of Germany .
1302795 11/1970 Fed. Rep. of Germany .
2356289 11/1974 Fed. Rep. of Germany .

Primary Examiner—Thuy M. Bui
Attorney, Agent, or Firm—Frishauf, Holtz, Goodman & Woodward

[57] ABSTRACT

To balance twisting torques acting on transmission chain pressure elements (11) located in an asymmetrical wedge zone between a friction disk (7,8) which has an essentially radially directed, plane face and a disk having a divergent, essentially conical engagement surface (14), the centers of curvature (17,18) of the friction surfaces (15,16) of the engagement elements are so positioned that the product of the engagement force components (20,21) acting parallel to the axes of rotation of the disks, and the radial spacing (a) of the contact points (19',23') at which the force components act is essentially equal to the product of the radially directed component (24) of the pulling force of the chain, when in operation, and the spacing (b') measured in a direction parallel to the respective shaft, of the contact point (23') of the pressure element with the disk having the substantially conical divergent engagement surface (14) from the center (C) of the pressure element, measured in its length direction. Any twisting moment tending to act on the pressure elements are thereby counter-balanced.

10 Claims, 2 Drawing Sheets

ASYMMETRICAL INFINITELY VARIABLE TRANSMISSION SYSTEM

Reference to related patents, the disclosure of which is hereby incorporated by reference, assigned to the Assignee of the present application:

U.S. Pat. No. 3,089,346, Dittrich and Steuer et al. corresponding to German No. 11 19 065;

U.S. Pat. No. 3,364,767, Bredschneider et al. corresponding to German No. 12 94 130;

U.S. Pat. No. 3,353,421, Ketterle et al. corresponding to German No. 13 02 795;

U.S. Pat. No. 3,916,709, Steuer et al. corresponding to German No. 23 56 289;

U.S. Pat. No. 3,016,755, Dittrich and Steuer et al. corresponding to German No. 10 88 294;

U.S. Pat. No. 4,276,041, Steuer corresponding to German No. 28 48 166.

The present invention relates to an infinitely variable transmission system in which a wedge-shaped zone is provided for a running chain with engagement elements, and more particularly to the structure of the engagement surfaces of the respective wedge elements of the drive units and the engagement elements of the connecting chain.

BACKGROUND

Various types of infinitely variable transmissions use an arrangement in which one of the transmission elements has a plane flat surface extending essentially at right angles to the drive shaft, and another one of the surfaces is essentially cone shaped. Actually, the surface is slightly curved, but in general approximates that of a shallow cone. The referenced patents, and specifically U.S. Pat. No. 4,276,041, illustrate such an arrangement. In such a transmission a chain with engagement elements is located between two pairs of friction disks, each located on an individual shaft. One of them is the drive shaft and the other a driven shaft. The chain runs between the wedge-shaped zone defined by the flanks of the respective friction disks. The chain is a link chain with linked elements which have transversely extending pressure or engagement elements. The pressure or engagement elements transmit frictional force between the disks and the engagement elements. The center points of the somewhat bowed engagement surfaces, radially, are on or beyond the contact positions of a theoretical parallel line to the respective operating axis of the disk pair.

Cone disk transmissions with asymmetrical reception region for the drive chain are frequently used where a compact construction is desirable. A single drive chain can be used to connect two such cone disks, or a dual transmission can be used, which can transmit high power within small space. In a dual system, a central disk having two essentially plane or flat faces is positioned between two cone disks. In a single chain transmission, the cone disk is axially shiftable on its shaft to adjust the transmission ratio; in a dual chain arrangement, at least one of the cone disks can be axially shiftable and, additionally, the central disk with the two essentially flat surfaces can shift axially. Of course, it rotates with the respective shaft, and is splined, or otherwise connected thereto to rotate therewith.

The transmission ratio of the overall system is changed by making diametrically oppositely positioned friction disks of the respective pairs on the respective shafts to be axially shiftable; the other friction disks, all having the conical surface, are axially secured to the respective shaft. The distribution between the axially fixed and axially shiftable friction disks, as described, maintains an essentially right angle running direction of the connecting chain with respect to the drive shafts, and effectively eliminates an axial offset, or change in tracking of the connecting chain. The connecting chains, with the engagement elements, can tolerate an offset in their longitudinal or running direction only to a very limited extent. To further improve the longitudinal running direction of the respective runs of the connecting chain, the conical surfaces are not strictly cone surfaces but, rather, are slightly bowed or bulged, in which the bowing follows a mathematical curve so designed that, within the adjustment range or transmission ratio, practically no change in the direction of the runs of the chain will obtain.

The friction disks with the flat faces provide engagement surfaces which are not precisely perpendicular to the running shaft. Exact radial alignment of these engagement flanks is not possible since, otherwise, the run-on of the chain in the wedge-shaped engagement zone would be undesirably influenced. Rather, the flanks have a slight clearance inclination, that is, define a cone with a cone angle of about 89°, to provide a 1° clearance towards the outer open region of the wedge-shaped engagement zone. This results in a slight tracking offset for the operating chain, which, however, is so small that it is acceptable. Additional increase of the axial offset of running of the chain due to changing the bowing of the conical friction surfaces should be avoided, however, since danger of contacting of the edge of the almost planar surface of the flat running chain might otherwise occur.

Various types of connecting chains for infinitely variable transmissions are known, and different arrangements may be used. The referenced U.S. patents show such chains. For example, U.S. Pat. No. 3,089,346 describes a chain in which the pressure elements are located either between the link positions of a link package or the pivot elements of the chain simultaneously form the pressure elements. Similar constructions are also shown in U.S. Pat. Nos. 3,364,767 3,353,421 and 3,916,709.

The connecting chains of the prior art have essentially circularly bent or bowed engagement surfaces. The bowing or bending on both sides of the pressure elements is the same. The entrance plug element and the exit plug elements, retained within the sleeve, preferably are infinitely variable cone transmissions having asymmetrical engagement region, that is, in which two cone surfaces face each other do not introduce further problems. In variable transmissions, however, having an asymmetrical engagement wedge zone requires further consideration for the formation of the engagement surfaces of the engagement elements, so that no tipping torque or tipping moment is caused by the asymmetry of the engagement wedge zone which can be transmitted to the pressure elements and hence to the chain itself. Such torques or moments would, otherwise, tend to twist the chain in the running direction, resulting in highly variable and differing longitudinal loading of the chain with respect to its width. The requirement of freedom from a tipping or twisting torque can be fulfilled by suitably shaping the facing surfaces, that is, by suitably shaping the bowing of the surfaces so that the resulting force which is applied to the pressure element goes through a common point which is located in the center of the pressure element, considered transversely to the running direction of the chain. As a result of such considerations, the bending radius of the engagement surfaces of the pressure elements, in all chains for an asymmetrical engagement zone, corresponds to half the thickness of the pressure elements, measured transversely to the running direction of the chain. This leads to a comparatively highly bowed or curved engagement surface. Such a highly curved surface results in high specific engagement pressure at the contact points between the engagement elements add the friction disks. High performance transmissions, with high transmission torques, may then have the tendency to form grooves on the friction disks, and subject the chain contact points to high wear. The operation time and the operating reliability of the transmission is determined in part by the generation of heat, and its dissipation, due to friction. Additionally, wear and tear and fatigue of material must be considered, so that the overall efficiency and efficacy of power transmission of the apparatus may be limited. The formation of grooves likewise increases the surface contact between the disks and the engagement element, which leads to hydrodynamic slippage with the well-known negative results that consistency of frictional engagement of the pair of pressure element - friction disk is no longer assured.

THE INVENTION

It is an object to provide a transmission having a transmission chain which has a high degree of stability of frictional constant between the chain engagement elements and the friction disks, while the specific engagement pressure and wear-and-tear, simultaneously, is reduced. Preferably, also, the torque and power transmission capability of the transmission system should be improved by obtaining better pressure relationships than previously known.

Briefly, the chain has friction elements which have respective radii R and r of curvature of friction surfaces. The radius R engages the essentially plane or flat friction disk, and the radius r engages the essentially conical friction disk. Both radii of curvature are larger than half the length of the pressure element, measured transversely to the running direction of the chain. The centers of curvature of the friction disks are so positioned that at any axial spacing of the disks of the pair—corresponding to the transmission ratio within the desired limits of transmission—the product of the engagement force component acting parallel to the axis of the respective shaft and the radial spacing of the contact points on which the force components act on the pressure elements, is essentially equal to the product of the radially directed component of the pulling forth of the chain, when in operation, and the spacing measured in a direction parallel to the shaft, of the contact points of the pressure element with the disk having the substantially conical divergent engagement surface from the center of the length dimension of the respective pressure element.

When constructing the pressure elements and the disks in accordance with the above relationship, it has been found that the surfaces of the pressure elements can be made with substantially more shallow curvature than heretofore, without, however, subjecting the pressure element to any substantial tipping moment or torque. This permits substantial reduction of specific pressure at the contact points between the pressure elements and the friction disks without danger of slippage between the pressure elements and the friction disks, due to hydrodynamic slip. The transmission thus can operate with lower wear-and-tear and at higher loading and permitting higher power transfer and higher torques. The arrangement additionally has the advantage that the contact points at the facing surfaces of the pressure elements tend to be spaced farther apart as the transmission range of the transmission changes. Thus, within all the possible positions of the chain on the friction disk surfaces—in dependence on the transmission ratio—a substantially greater proportion of the friction disk surface will be used for transmission, so that tee wear-and-tear is distributed over a larger area.

The respective products which are to be essentially equal may be exactly equal or the product of engagement force component—the first element in the equation—may be slightly higher than the product of the second element of the equation. This slight difference is used to permit new chains to be somewhat excessively dimensioned, so that initial run-in wear-and-tear can be considered. This initial run-in wear-and-tear may result in a slight tipping or twisting moment or torque, under the influence of which the pressure elements tend to wander radially outwardly on the friction disk which has the essentially conical flank. By so designing the engagement surfaces of the engagement elements of the chain that the first-named product is slightly greater than the second, the difference will be essentially compensated upon run-i of the chain. The initial wear will have been consumed so that, for the major operating period of the chain, a general .equality of the respective products of the relationship will pertain.

The second part of the equation relates to the product of the radially directed component of the pulling force and the spacing of the contact point of the pressure element from the center dimension of the pressure element. The pulling force of the chain acts essentially at the center of the respective pressure elements. Actually, theoretically this does not exactly relate to the reaction force which is provided by the radially directed component of the pressure between the engagement element and the conically inclined flank of the conical friction disk. It has been found, however, that for all practical purposes, the engagement point of the pulling force of the chain corresponds to the actual conditions, in operation of the chain.

In accordance with a feature of the invention, the radius of curvature of the engagement face of the engagement element which faces the essentially plane or flat friction disk is smaller than the radius of curvature of the other, opposite engagement face. Thus, the paired faces will have contacting surfaces of essentially equal size, thereby increasing the overall power transmission capability.

DRAWINGS

FIG. 1 is a highly simplified schematic top view of a transmission in accordance with the present invention, utilizing a double-chain drive; and FIG. 2 is a schematic diagrammatic view of a pressure element in engagement with an essentially conical disk and a flat or plane disk, and illustrating the respective force and pressure relationships, including a force vector diagram.

DETAILED DESCRIPTION

Figure 1:
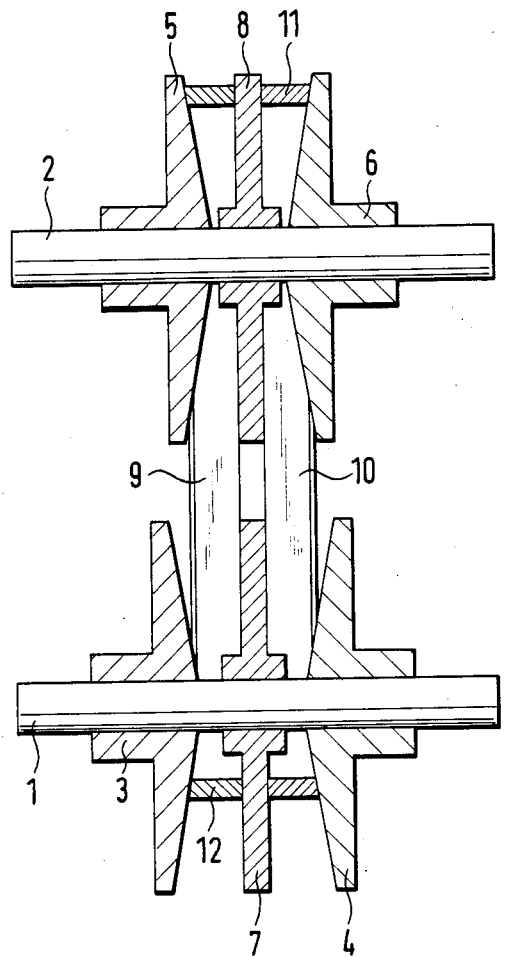

A dual chain transmission is shown schematically in FIG. 1. Two friction disks 3,4 with essentially conical faces are located on a shaft 1 which, as desired, may be a drive shaft or a driven shaft. A driven, or drive shaft 2 has similar essentially conical faced friction disks 5,6 secured thereto, that is, to rotate therewith. Friction disks 7,8 are secured to the respective shafts 1,2, that is, to rotate therewith, located between the respective conical-faced disks 3,4 and 5,6. The side surfaces or flanks of the disks 7,8 extend essentially radially with respect to the axes of the shafts 1,2. Link chains 9,10 run between the respective facing surfaces of the flat disks 7,8 and the associated conical disks 3,4 and 5,6.

The transmission ratio of the arrangement is controlled, in accordance with any well-known manner, by shifting two diagonally opposite friction disks having the conical faces, for example the disk 4 on shaft 1 and the disk 5 on shaft 2. The disks 4,5 can be splined to the shafts, so as to rotate with the shafts, while being axially movable. The other friction disks with conical surfaces, that is, the disks 3,6 are secured axially to the shafts 1,2. To adjust the respective center between the disk pairs 3,4,5,6, the flat faced disks 7,8 can move axially on the respective shafts 1,2, for example by being movably splined thereto.

The exact shape of the flanks of the disks 3–6 and 7,8 is not shown in FIG. 1 and will be discussed in detail below. In combination with the curvatures of the facing surfaces of the disks 3,4,5,6, the chains 9,10 will operate, as shown, practically or essentially at right angles to the axes of the shafts 1,2 within the entire transmission range of the continuously variable transmission, that is, the chains will not be canted, or inclined to any essential degree with respect to a plane passing at right angles through the shafts 1,2.

A single-chain transmission would use only half of the arrangement shown in FIG. 1, for example only the right half. The friction disks 7,8 will then be secured in fixed axial position on the shafts 1,2 and friction disks 4 and 6 can be shifted axially to adjust the transmission ratio.

The chains 9,10—or, if only a single chain transmission is used a at chain 10—includes link elements and transversely extending pressure elements 11,12. The pressure elements have facing end surfaces which engage the facing surfaces of the friction disks to provide for frictional force transmission therebetween, and thus torque transfer between the disks associated with a drive shaft to the disks associated with a driven shaft. Which one is the drive shaft and which one is the driven shaft in the arrangement shown is immaterial, since it is bi-directional and symmetrical.

The frictional relationships and the engagement forces between the pressure elements 11,12 and the respective facing surfaces of the disks is shown in detail, to an enlarged scale, in FIG. 2, to which reference will now be made.

Figure 2:
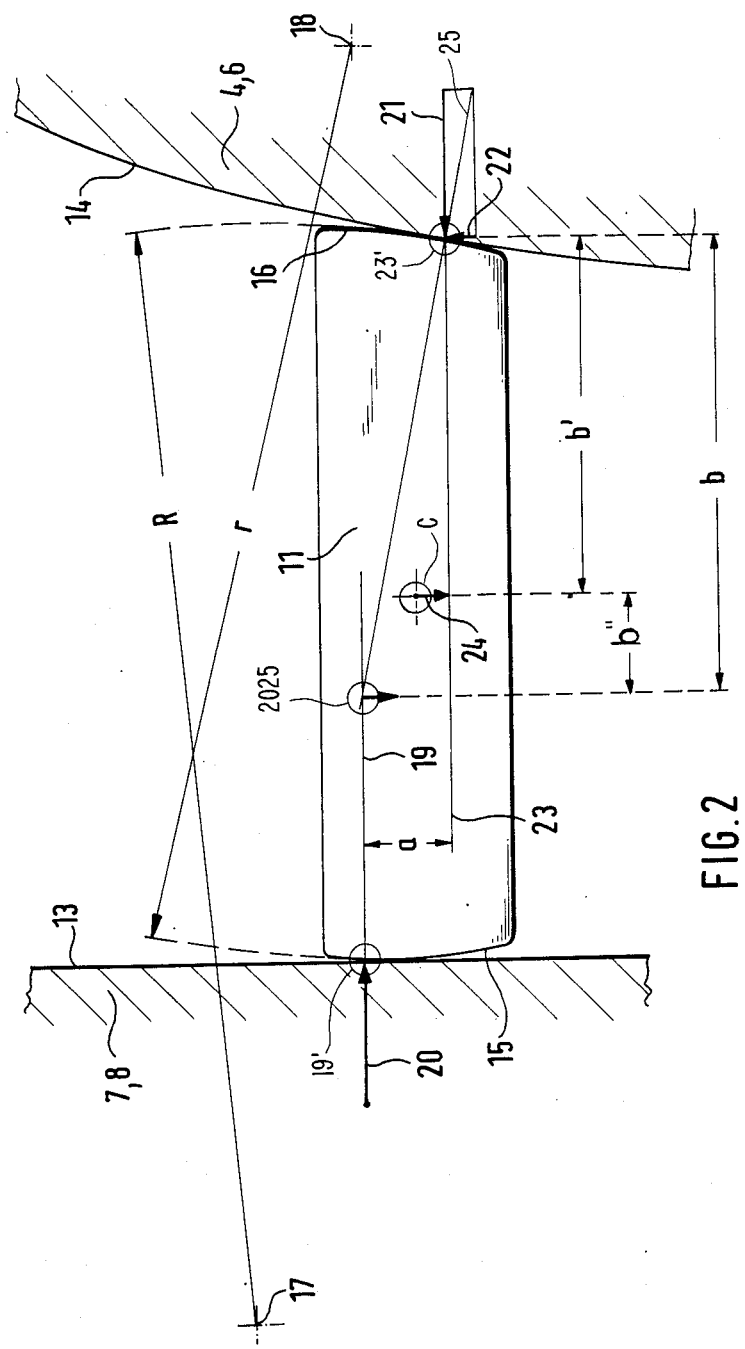

As can be seen in FIG. 2, the wedge-shaped engagement zone or region is non-symmetrical with respect to the axis of rotation of the respective disks. It is defined by the essentially radially extending flanks 13 of the flat friction disks 7, or 8, and the essentially conically inclined flank 14 of the associated friction disk 4 or 6. A pressure element 11 is located between the flanks 13,14. The pressure element 11 has facing surfaces 15,16 which are curved in radial direction with respect to the friction disks 4,6 or 7,8, respectively. The centers 17,18 of the respective radii of curvature, that is, radius R and radius r, are located, measured radially with respect to the friction disks, on or beyond a line 19, or 23, respectively, and preferably only line 19, which extends parallel to the axis of rotation of the friction disks. Line 19 extends through the contact point of the pressure element 11 with the plane or flat friction disk 13. This contact point is shown at 19' in FIG. 2; the contact point of the pressure element 11 with the essentially conically faced disk 4,6 is shown at 23', through which the line 23, parallel to the axis of rotation, passes.

The engagement forces, necessary for frictional force transmission, act on the end face surfaces 15,16 of the pressure element 11 at the contact points 19',23' with the flanks 13 and 14 of the friction disks. At the contact point 19', that is, at the engagement point of the pressure element 11 with the essentially plane or flat disk 7,8, the engagement forces are represented by the pressure vector 20, which extends essentially parallel to the axis of rotation of the disk 7,8. At the inclined face 14, however, where the friction element 11 is engaged with the disk 4 or 6, the force vector 25 has an axial component 21 and a radial component 22.

The effective engagement lines 19,23 of the axially parallel components 20,21 are spaced from each other, radially, by a spacing a . They provide a torque or rotation moment, acting in clockwise direction. The radial component 22, has a spacing b to the intersection 2025 of the force vector 25 with the engagement force of vector line 19. The spacing b" of this intersection 2025 from the center C of the pressure element 11, measured transversely to the running direction of the chain, generates a torque or rotary moment in counterclockwise direction. In accordance with a feature of the invention, the radii R and r of the respective facing surfaces 16 and 15 then are so selected that the moments or torques acting on the pressure element 11 and derived from the forces 20 and 21, with the moment arm a on the one hand are balance,, or in equilibrium with the radial force component 22 having the force arm or spacing b . In actual practice, it has been found that the reaction force corresponding to the radial force component 22 corresponds essentially to the chain pulling force 24, which effectively is applied at the center C, measured transversely to the running direction of the chain, of the pressure element 11, thereby decreasing the leverage or force arm of the moment from b to the spacing shown in FIG. 2 at b'. The intersection point 2025 of the respective reaction forces 20 and 25 will then fall in the region between the flat engagement surface 13 of the flat disk 7, or 8, respectively, and the center C—with respect to the running direction of the chain—of the pressure element 11; and the torques applied to the chain will effectively balance.

Balance of the moments which are applied to the pressure element 11 permits increasing the radii r and R to be substantially greater than heretofore considered suitable, which corresponded to half the measured thickness of the pressure element 11, measured transversely to the running direction of the chain. The quite flat curvature of the faces 15 and 16 will result. This, again, permits decreasing the surface pressure between the facing surfaces and the flanks 13,14 of the disks, thus decreasing wear-and-tear while increasing the power and torque transfer capability of the transmission.

FIG. 2 also clearly shows that the radius r of the surface 15 associated with the essentially radial face 13 of disk 7,8 is smaller than the radius R associated with the facing surface 16, engaging the essentially conical face 14 of disk 4,6. This arrangement permits formation of the contact surface, or the contact region 19' at the radial flank 13 to be approximately the same and preferably just the same as the contact zone or region 23' on the essentially conical flank 14 of disk 4,6, thus additionally contributing to an increase of the power transfer capability of the transmission.

We claim:

1. Continuously variable transmission comprising the combination of
   a drive shaft (1);
   a driven shaft (2) radially spaced from the drive shaft;
   a pair of friction disks (3-7, 5-8; 4-7, 6-8);
   a first pair (3-7, 4-7), each being secured to the drive shaft for rotation therewith;
   a second pair (5-8, 6-8) being secured to the driven shaft for rotation therewith,
   one disk (7,8) of each pair being essentially flat and defining an essentially flat engagement surface (13) substantially located in a plane essentially perpendicular to the respective shafts (1,2) to which said one disk is secured,
   another disk (3,4; 5,6) of each pair defining a divergent engagement surface (14) which is substantially conical with the apex of the cone angle located concentrically with respect to the axis of rotation of the respective shaft (1,2) to which the another disk is secured,
   said disks being located with axially facing engagement surfaces (13,14),
   one disk of each pair being axially movable on the associated shaft,
   said essentially flat engagement surface (13) and said divergent engagement surface (14) defining therebetween an asymmetrical wedge zone; with
   a link chain (9, 10) connecting the pairs of disks, positioned in said wedge zone, and, in operation, generating a pulling force, said drive chain engaging the disks and defining spaced contact points (19', 23') with said disks and, upon transfer of power through the transmission, generating engagement force components (20, 22) between the chain and said disks, and consequent equal and opposite reaction force components within said pressure elements (11, 12),
   said link chain including
   essentially cylindrical pressure elements (11, 12) extending perpendicularly to the running direction of the chain and having friction surfaces (15, 16) in frictional engagement with the respective engagement surfaces (13, 14) of the disks of the pairs connected by the chain,
   said friction surfaces (15, 16) being essentially circularly curved and having different radii (R, r) and centers (17, 18) of curvature on or outside, in radial direction of the respectively engaged disk, a theoretical line (19, 13) parallel to the respective shaft (1, 2) and passing through the contact points (19', 23') of the respective friction surfaces (15, 16) with the engagement surfaces (13, 14) of the respective disks, and
   an arrangement to balance torques about the running direction of the chain and applied to said pressure elements (11, 12) during operation of the transmission,
   wherein the radii (R, r) of curvature of the friction surfaces (15, 16) are greater than half the length of the pressure elements (11, 12), measured transversely to the running direction of the chain (9, 10); and
   wherein the centers (17, 18) of curvature of the friction surfaces are so positioned that, at any axial spacing of the disks of the pair and corresponding to a transmission ratio of the transmission,
   the vectorial product of the engagement force components (20, 21) acting parallel to the axes of the respective shafts, and the radial spacing (a) of the contact points (19', 23') of such force components acting on the pressure elements (11, 12) is essentially equal to the vectorial product of the radially directed component (24) of the pulling force of the chain, when in operation, and the spacing (b'), measured in a direction parallel to the respective shaft, of the contact point (23') of the pressure element (11, 12) with the disk (3, 4; 5, 6) having the substantially conical divergent engagement surface (14) from the center (C) of the length dimension of the pressure element.

2. The transmission of claim 1, wherein the radius (r) of curvature of the friction surface (15) of the pressure element (11) in engagement with the engagement surface (13) of the disk (7,8) which is essentially flat is smaller than the radius of the friction surface (16) opposite the engagement surface (14) of said other disk (4,6) having the divergent engagement surface.

3. The transmission of claim 1, comprising a double-chain transmission in which said one disk of each pair is a unitary disk having two opposite essentially flat engagement surfaces (13), and two disks having the divergent engagement surfaces (14) are located on the respective shaft on either side of said double-faced disks (7,8).

4. The transmission of claim 3, wherein said double-faced disks (7,8) are axially movable on the shaft while being rotatably coupled thereto, and one disk having said divergent engagement surface is axially positionable on the respective shaft at a controlled spacing from the other disk having said divergent engagement surface.

5. The transmission of claim 3, wherein the radius (r) of curvature of the friction surface (15) of the pressure element (11) in engagement with the engagement surface (13) of the disk (7,8) which is essentially flat is smaller than the radius of the friction surface (16) opposite the engagement surface (14) of said other disk (4,6) having the divergent engagement surface.

6. Continuously variable transmission comprising the combination of
   a drive shaft (1);
   a driven shaft (2) radially spaced from the drive shaft;
   a pair of friction disks (3-7, 5-8; 4-7, 6-8);
   a first pair (3-7, 4-7), each being secured to the drive shaft for rotation therewith;
   a second pair (5-8, 6-8) being secured to the driven shaft for rotation therewith,
   one disk (7,8) of each pair being essentially flat and defining an essentially flat engagement surface (13) substantially located in a plane essentially perpendicular to the respective shafts (1,2) to which said one disk is secured,
   another disk (3,4; 5,6) of each pair defining a divergent engagement surface (14) which is substantially conical with the apex of the cone angle located concentrically with respect to the axis of rotation of the respective shaft (1,2) to which the another disk is secured, said disks being located with axially facing engagement surfaces (13, 14), one disk of each pair being axially movable on the associated shaft, said essentially flat engagement surface (13) and said divergent engagement surface (14) defining therebetween an asymmetrical wedge zone; with a link chain (9, 10) connecting the pairs of disks, positioned in said wedge zone, and, in operation, generating a pulling force, said drive chain engaging the disks and defining spaced contact points (19', 23') with said disks and, upon transfer of power through the transmission, generating engagement force components (20, 22) between the chain and said disks, and consequent equal and opposite reaction force components within said pressure elements (11, 12), said link chain including essentially cylindrical pressure elements (11, 12) extending perpendicularly to the running direction of the chain and having friction surfaces (15, 16) in frictional engagement with the respective engagement surfaces (13, 14) of the disks of the pairs connected by the chain, said friction surfaces (15, 16) being essentially circularly curved and having different radii (R, r) and centers (17, 18) of curvature on or outside, in radial direction of the respectively engaged disk, a theoretical line (19, 13) parallel to the respective shaft (1, 2) and passing through the contact points (19', 23') of the respective friction surfaces (15, 16) with the engagement surfaces (13, 14) of the respective disks, and an arrangement to balance torque about the running direction of the chain and applied to said pressure elements (11, 12) during operation of the transmission, wherein the radii (R, r) of curvature of the friction surfaces (15, 16) are greater than half the length of the pressure elements (11, 12), measured transversely to the running direction of the chain (9, 10); and wherein the centers (17, 18) of curvature of the friction surfaces are so positioned that, at any axial spacing of the disks of the pair and corresponding to a transmission ratio of the transmission, an intersection point (2025) of the vectors of the reaction forces (20, 25) will fall in the region between the flat engagement surface (13) of the flat disk (7, 8) and the center (C) of the pressure element, measured transversely to the running direction of the chain.

7. The combination of claim 6, wherein the radius (r) of curvature of the friction surface (15) of the pressure element (11) in engagement with the engagement surface (13) of the disk (7, 8) which is essentially flat is smaller than the radius of the friction surface (16) opposite the engagement surface (14) of said other disk (4, 6) having the divergent engagement surface.

8. The transmission of claim 6, comprising a double-chain transmission in which said one disk of each pair is a unitary disk having two opposite essentially flat engagement surfaces (13), and two disks having the divergent engagement surfaces (14) are located on the respective shaft on either side of said double-faced disks (7,8).

9. The transmission of claim 8, wherein said double-faced disks (7,8) are axially movable on the shaft while being rotatably coupled thereto, and one disk having said divergent engagement surface is axially positionable on the respective shaft at a controlled spacing from the other disk having said divergent engagement surface.

10. The transmission of claim 8, wherein the radius (r) of the curvature of the friction surface (15) of the pressure element (11) in engagement with the engagement surface (13) of the disk (7, 8) which is essentially flat is smaller than the radius of the friction surface (16) opposite the engagement surface (14) of said other disk (4, 6) having the divergent engagement surface.

* * * * *